Patented Sept. 8, 1942

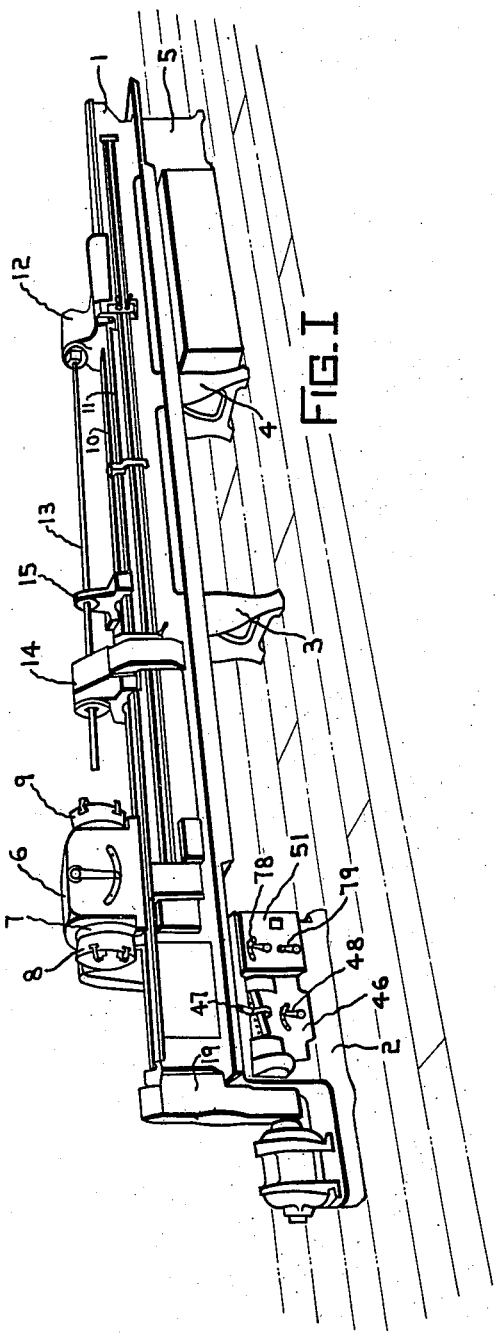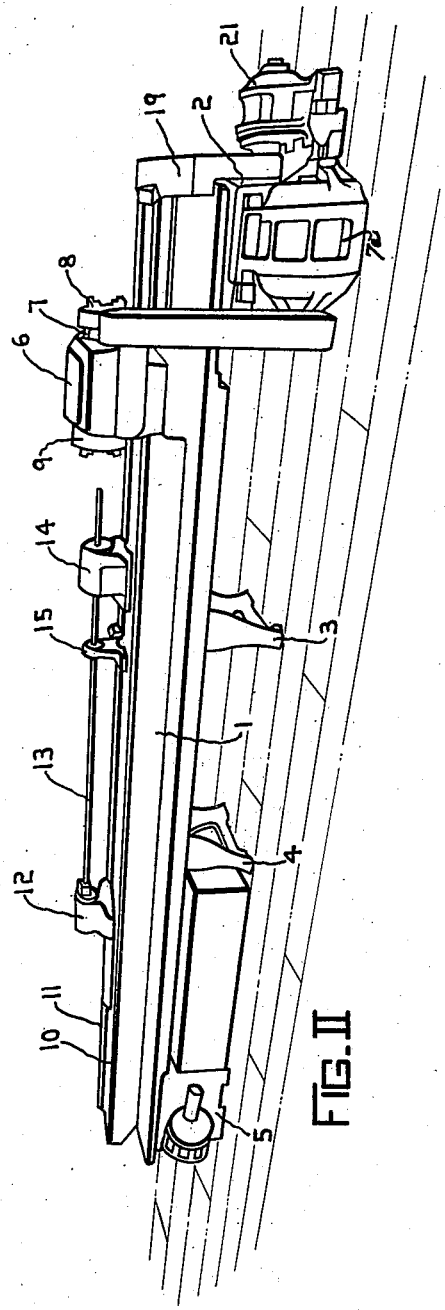

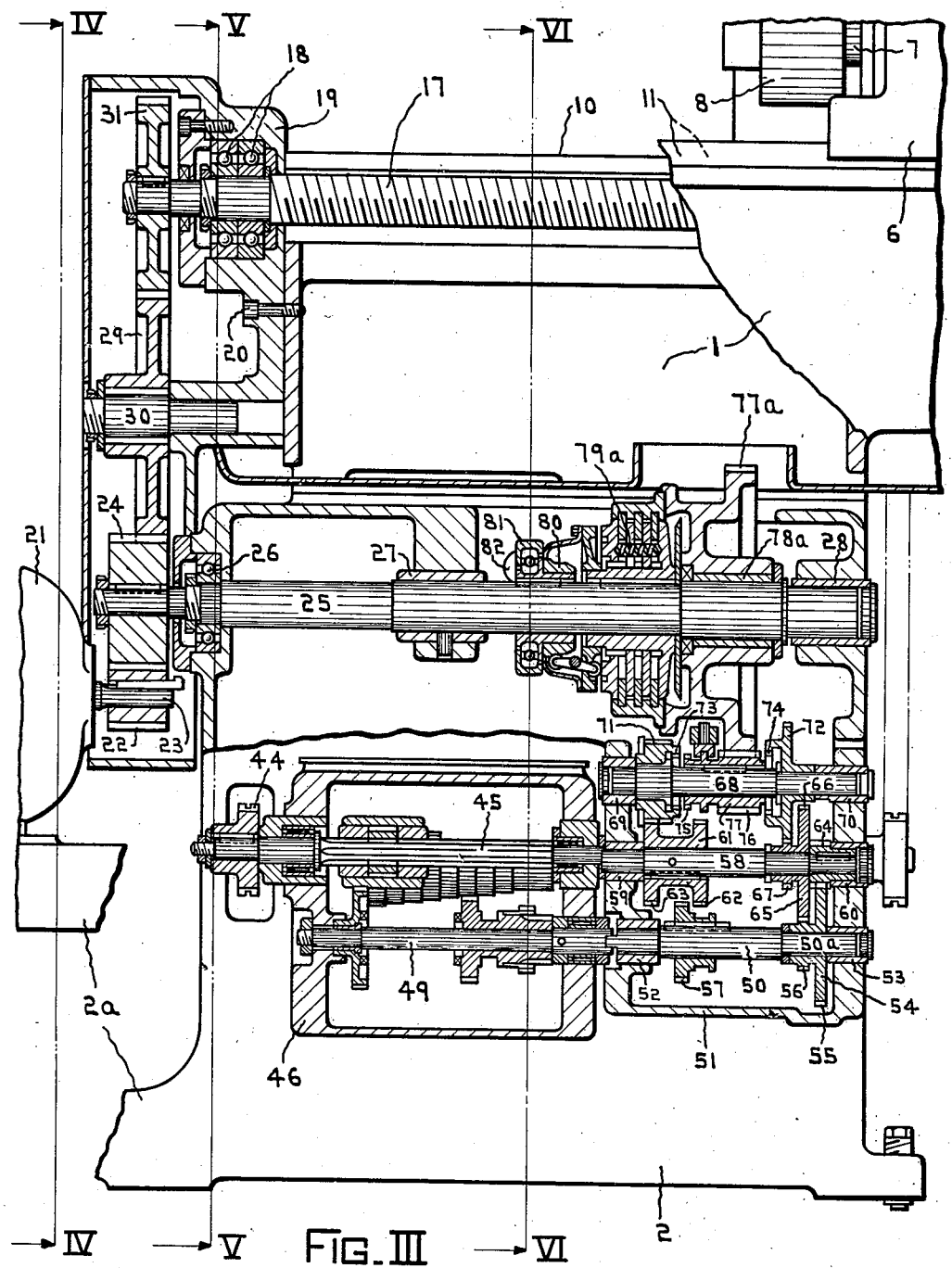

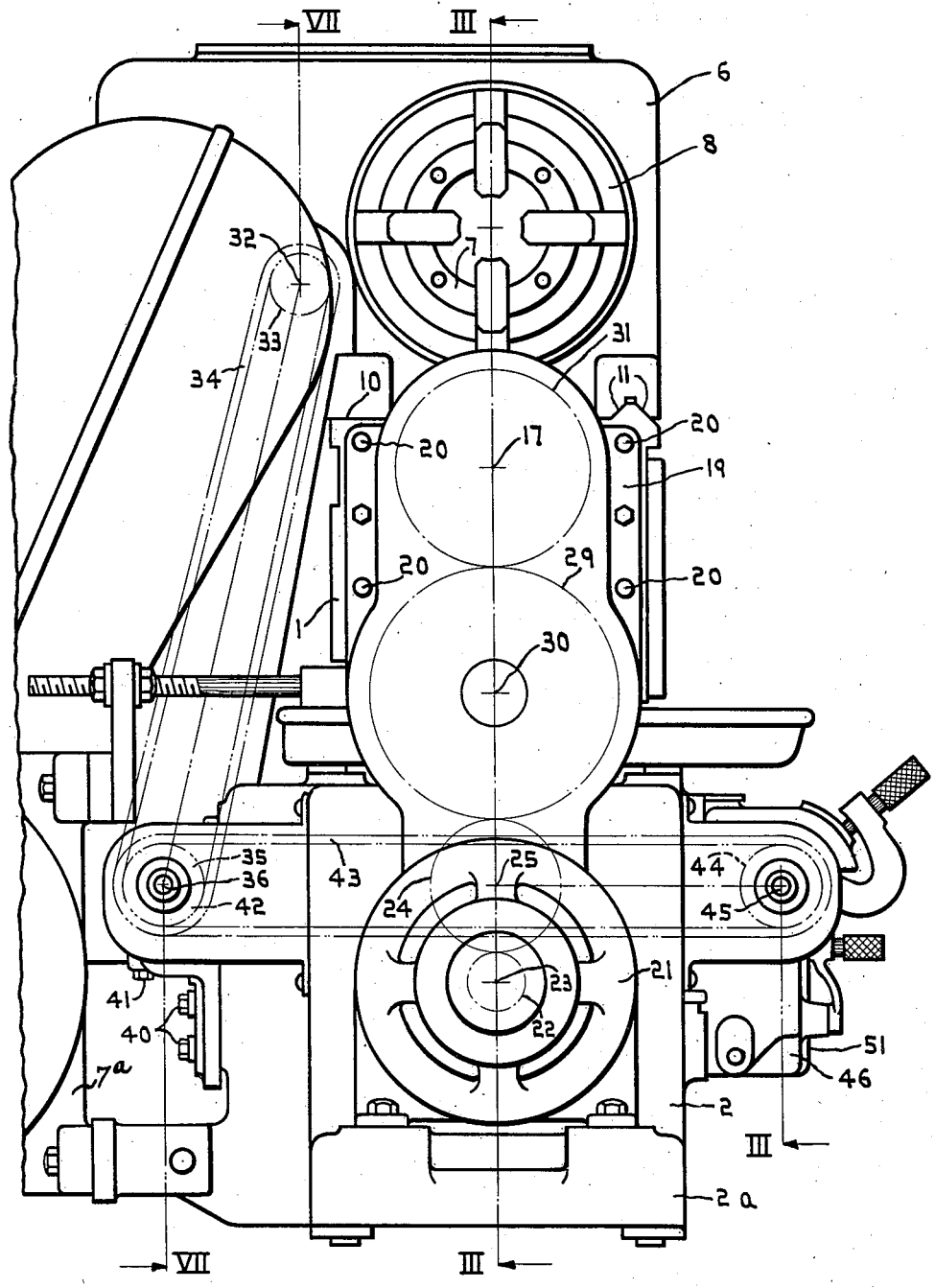

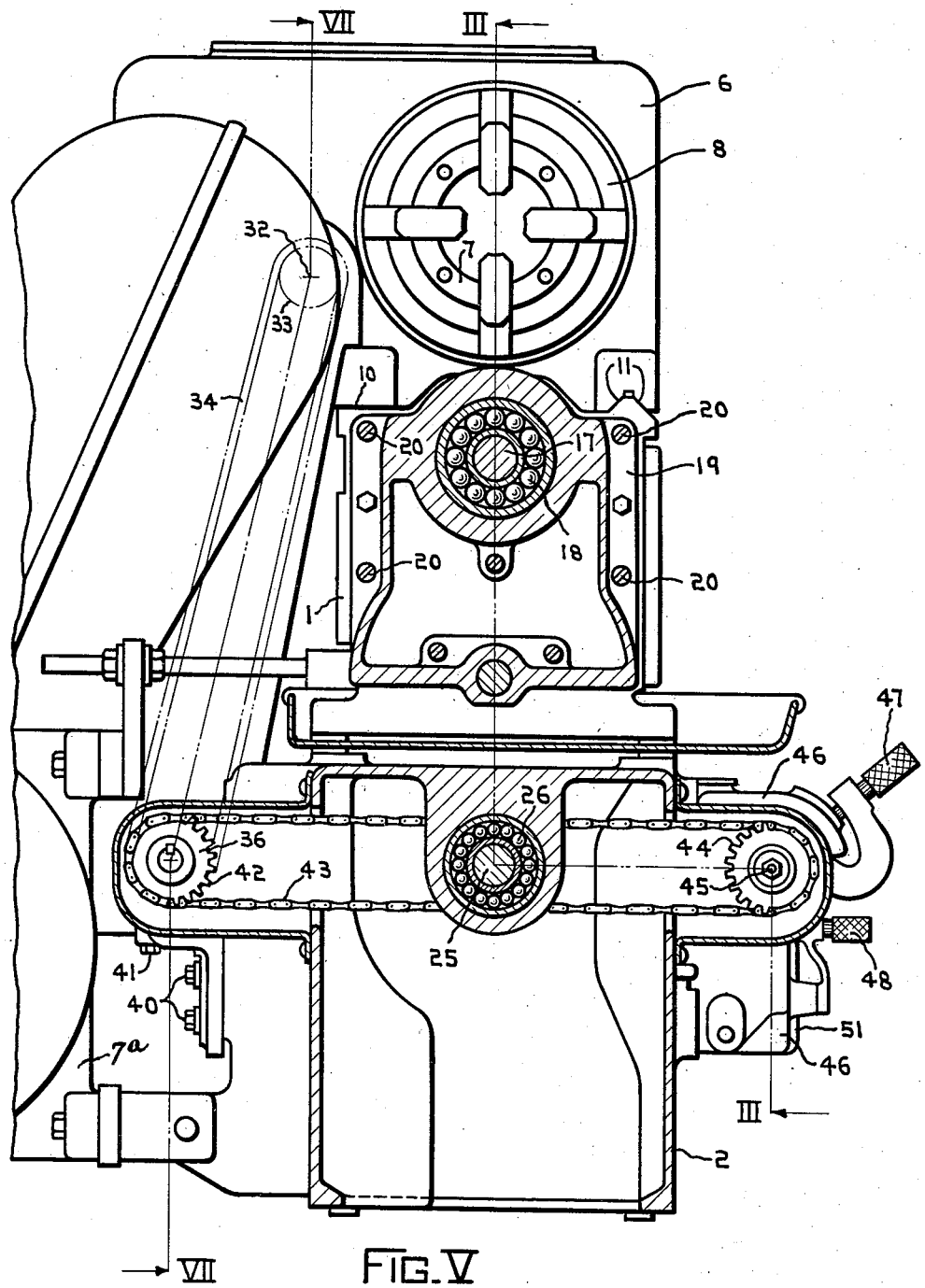
FIG. V

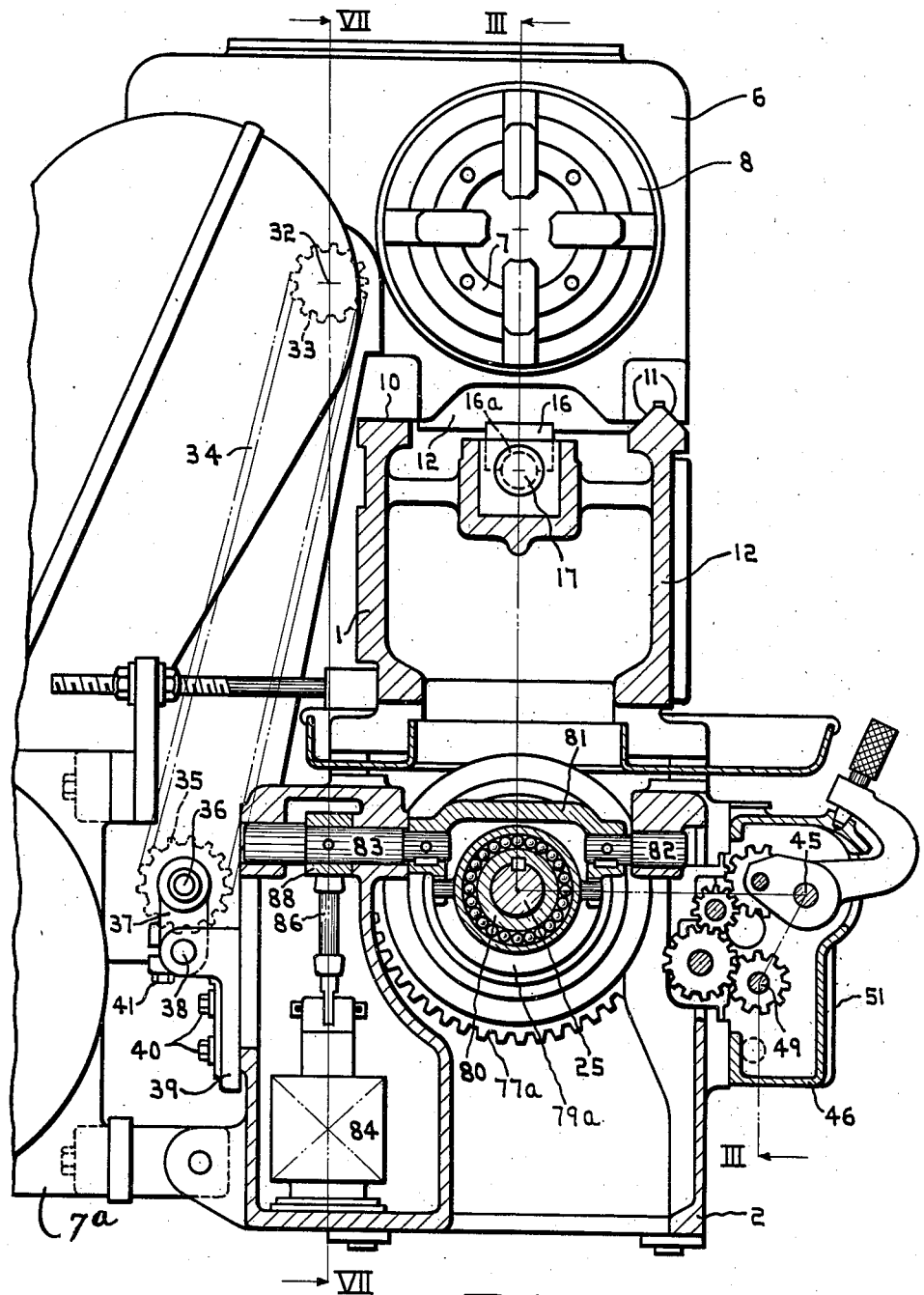
FIG. VI

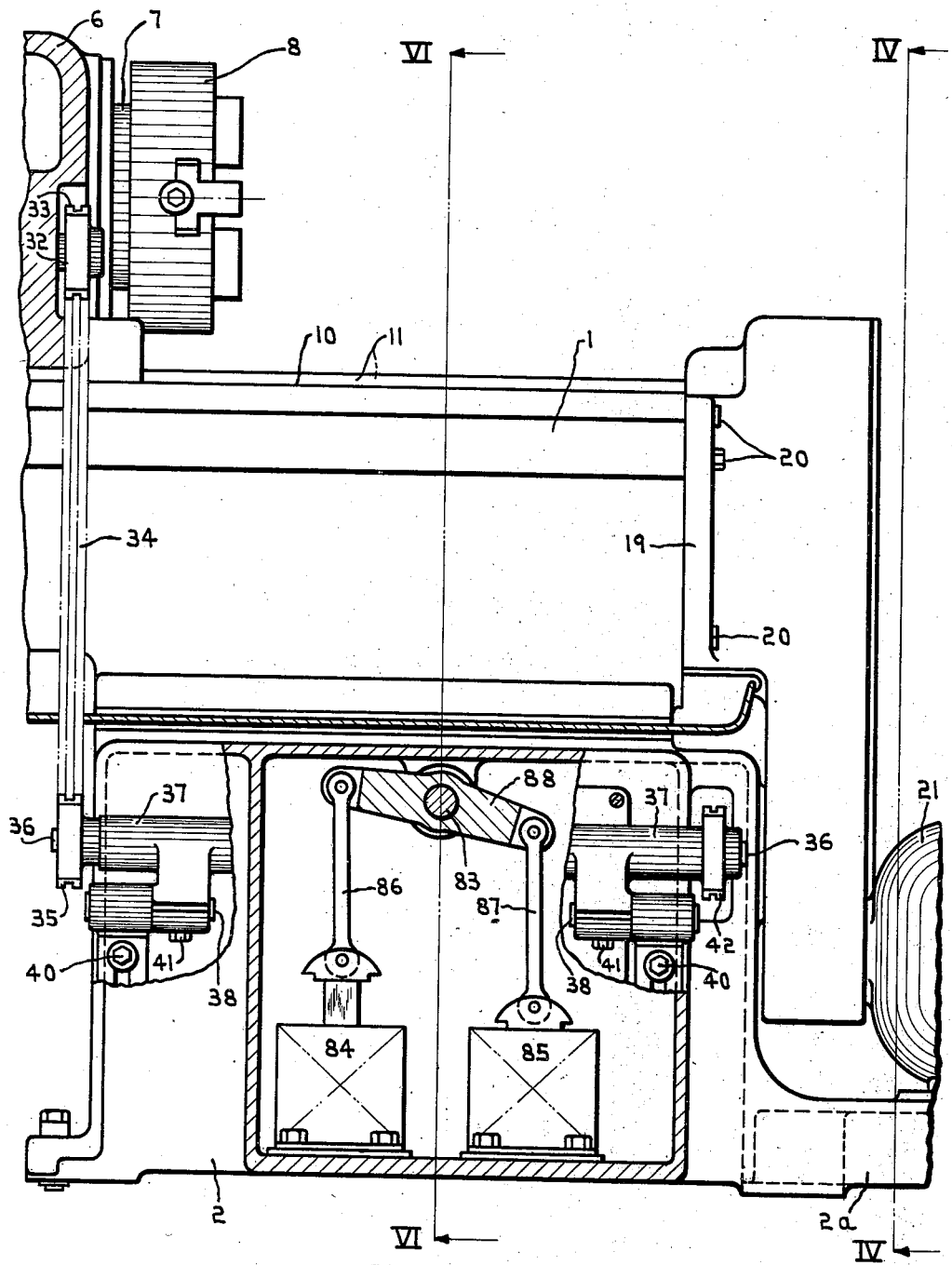

2,295,079

UNITED STATES PATENT OFFICE 2,295,079

FEED AND RAPID TRAVERSE MECHANISM

William F. Groene and George W. Luning, Cincinnati, Ohio, assignors to The R. K. Le Blond Machine Tool Company, Cincinnati, Ohio, a corporation of Delaware Application September 28, 1940, Serial No. 358,872

2 Claims. (Cl. 82—21)

This invention pertains to certain specific improvements in feed and rapid traverse mechanism particularly of a character set forth in the patent of William F. Groene, et al., Number 2,069,107, dated January 26, 1937. More especially this invention is adapted to the feeding and rapid traversing, with a careful nicety and accurateness of control, of the boring tool holder of a gun boring or tube boring lathe.

In such types of lathes it is especially important to be able to rapidly convert the movement of the boring bar holding member from rapid traverse to slow speed movement and vice versa to effect the most efficient boring and cutting action of the boring tool in the work to be bored. Coupled with this desired nicety of control is the problem of relatively long distance of feed and rapid traverse travel which is inherent in such type of tube or gun boring lathes and it is desirable to be able to at any time throughout this extended travel at feed or rapid traverse, to be able to accurately stop either of the motions of feed and rapid traverse within close limits and with a smoothness of operation which will prevent damage to the cutting tool and to the tubular work being bored.

To this end, we have provided a unique feeding arrangement for specific application to the difficult problem of rapid traversing and feeding the boring bar holder of such lathes in which change from feed to rapid traverse or from rapid traverse to feed effected in a smooth and efficient manner while providing the desirable necessary mechanical screw feed actuation to the boring bar holder.

Another object of this invention is to provide in conjunction with the feed drive mechanism, suitable change speed gearing giving a predetermined fixed rate of feed movement of the boring bar holder relative to the spindle rotation of the machine which may be relatively selectable for the desired material and type of boring operation to be undertaken and it is also a feature of this invention, to incorporate in conjunction with this mechanism, a reversing mechanism, so that the feeding operation may take place in either direction.

In conjunction with such feeding mechanism, it is our purpose to have a rapid traversing motor positively connected to the feeding mechanism at all times and energizable for effecting rapid traversing of the boring bar holder, while the feeding mechanism is disconnected momentarily from the screw actuating mechanism for the holder, And it is also an object of this invention, to utilize, in conjunction with the selectable feeding mechanism, a clutching device whereby when the rapid traverse power is instantly cut off, the feed may be instantly engaged to instantly arrest rapid traverse movement of the boring bar feeding device and immediately cause the feeding power to be transmitted to the screw actuating mechanism for the boring bar holder.

Further features and advantages of this invention will appear from the detailed description of the drawings in which:

Figure I is a front perspective view of a typical gun boring lathe showing my invention applied thereto.

Figure II is a rear perspective view of the gun boring lathe of Figure I.

Figure III is a fragmentary diagrammatic section through the feed and rapid traverse mechanism of the lathe of Figures I and II, shown on the line III—III of Figures IV, V, and VI.

Figure IV is a left hand end elevation of the machine of Figures I and II, shown particularly by the line IV—IV in Figures III and VII.

Figure V is a transverse section through the gun boring lathe on the line V—V of Figure III.

Figure VI is a transverse section through the machine on the line VI—VI of Figures III and VI.

Figure VII is a rear view, partly broken away in section, on the line VII—VII of Figures IV, V, and VI, particularly showing the rear portion of the feed and rapid traverse mechanism of Figure III.

Noting particularly Figures I and II, our invention is shown applied to a typical mechanical screw feed gun boring or tube boring lathe having a bed 1, which is supported on the legs 2, 3, 4 and 5 and on top of which is mounted, in fixed position, the center drive headstock 6, having a suitable rotatable hollow work spindle 7 on each end of which are carried the chucks 8 and 9 which grip the tubular member to be bored.

Slidably mounted on the ways 10 and 11 of the bed 1, is the boring bar feeding carrier 12 which is actuated longitudinally of the bed in feeding or rapid traverse movements by the unique apparatus which constitutes the patentable subject matter in this application. This boring bar feeding member 12 carries the usual boring bar 13, which passes through the supporting members 14 and 15 as is customary in these types of machines, while the bar is operating in the bore of the work piece chucked in the chucking devices 8 and 9 of the headstock 6.

Noting particularly Figure VI, on the bottom of the boring bar feeding member 12, is fixed a halfnut 16, having a semi-circular threaded portion 16a which engages in the feed and rapid traverse actuating screw 17, which is located centrally of the bed 1 of the machine and is appropriately journaled in suitable bearings at either end of the bed. At the left hand end of the bed, Figure III, it is supported on the bearings 18 carried in the bracket 19, fixed to this left hand end of the bed by suitable screw 20. In this way, rotation of the screw at slow or rapid rates effects the relative feeding and rapid traversing movement of the boring bar feeding device 12.

Power for actuating the screw 17 at rapid traverse speeds, in either direction, is effected by appropriately energizing the rapid traverse electric motor 21 which is mounted on the projecting integral portion 2a of the leg 2, the motor having a pinion 22 appropriately fixed on its shaft 23, which drives the combined feed and rapid traverse transmission gear 24 which is fixed on the feed clutch shaft 25 suitably journaled in bearings 26, 27, and 28 in the leg 2. The gear 24 in turn is connected to the idler gear 29 journaled on a stud 30 fixed in the bracket 19, which idler gear engages the gear 31 fixed on the outer end of the screw 17, so as to positively rotate it when it is rotated in either direction by the rapid traverse motor 21.

Power for rotating the screw 17 at feeding speeds in predetermined relationship to spindle rotation, is derived from the feed output shaft 32 of the headstock 6, which is connected by the usual gearing (not shown) in the headstock 2; to rotate at all times in fixed predetermined relationship to the rotation of the spindle 7 of the headstock driven by the same drive motor 7a. On the end of this shaft 32 is provided a sprocket 33 over which operates the feed chain 34, which passes over a sprocket 35, fixed on a shaft 36 suitably journaled in the adjustable bracket 37 carried on suitable trunnions 38 which are carried on the supports 39 bolted to the leg 2 by suitable screws 40 and to which the brackets 37 may be securely clamped by the screws 41. On the other end of this shaft 36 is fixed a sprocket 42 over which passes the driving chain 43 which in turn passes over a sprocket 44 fixed on the input shaft 45 of a conventional lathe quick change or feed box 46 of a type, for example, as shown in Patent Number 980,973 of R. K. Le Blond, et al., issued January 10, 1911.

This feed box 46 has the usual control handles 47 and 48 for effecting the desired selection of specific rates of feeds for the boring bar feeding member 12 as is customary in a lathe. The output shaft 49 of this feed box 46, is connected to the input shaft 50 of the coarse feed change and reversing gear box 51, also mounted on the front of the leg 2. This gear box 51 is constructed as follows: The shaft 50 is journaled in suitable bearings 52 and 53 in the box 51 and has journaled on its smaller bearing portion 50a, a compound gear 54 comprising the gears 55 and 56. Also a shiftable gear 57 is slidably mounted in driving relation on this shaft 50. A second intermediate shaft 58 is similarly journaled in bearings 59 and 60 in the box 51. On this shaft 58 is fixed the double gear 61 comprising the gears 62 and 63 and also fixed on the shaft and forming part of the bearing 60 is the pinion 64. Adjacent this pinion 64 is the compound gear 65 comprising the gear 66 and 67. The pinion 64 is at all times in driving engagement with the gear 55 of the compound gear 54, while the gear 66 of the compound gear 65 is at all times in driving engagement with the gear 56 of this compound gear 54.

Associated with these shafts 50 and 58 is the output shaft 68 which is appropriately journaled in bearing 69 and 70 in the gear box 51. On this shaft 68 is journaled the gear 71 which is at all times in driving engagement with the gear 63 of the double gear 61. Also on this shaft is journaled the gear 72 which is arranged at all times in driving engagement with the gear 67 of the compound gear 65. Each of these gears 71 and 72 are provided with respectively internal clutch gear teeth 73 and 74, which may be respectively engaged by the clutch teeth 75 of the gear 76 of the sliding sleeve gear 77 shiftably mounted in driving relation on the shaft 68. The usual control handle 78 is provided for effecting the shifting engagement of the gear 77 to effect the clutching of the clutch members 73 and 75 or the gear 76 with the clutch teeth 74 of the gear 72 by manipulation of the control handle 78, Figure I. The gear 57 may similarly be shifted on its shaft 50 by a lever 79 in the usual manner for such levers, so that it may be respectively engaged either with the gear 62 of the double gear 61 or directly with the gear 71 on the shaft 68, so as to provide a reversal of drive between the gear 57 and the gear 71.

By thus shifting the gear 57 by means of the lever 79, reversal of drive is effected between the shaft 50 and the shaft 68. When the gear 57 is shifted to the left in mesh with the gear 71, obviously the shaft 68 will rotate in the opposite direction from that of the shaft 50. Now when the gear 57 is shifted to the right in engagement with the gear 62 of the double gear 61 on the shaft 58, the result will be that the gear 71 will be rotated in the same direction as the shaft 50. Driving action from the shaft 50 to the shaft 68 may be thus effected in two directions and also at two different rates of speeds. For example, one rate of speed is effected by having the sleeve gear 77 shifted to the left with its clutch member 75 in engagement with the clutch member 73 of the gear 71 in which the drive in one direction may be from the shaft 50 through the gear 57 to the gear 71 and thereby directly to the shaft 68 having in this construction a 1 to 1 drive between the shaft 50 and the shaft 68, both shafts rotating at the same speed and of course, the reverse condition with the clutch member 75 and 73 in engagement is accomplished by shifting the gear 57 into engagement with the gear 62 as described.

Another difference in relative speed between the shaft 50 and the shaft 68, in which the shaft 68 is rotated at a much lower speed, is that effected when the gear 76 is shifted into the clutch member 74 and the gear 72, in which case, in one instance, the drive from the shaft 50 with the gear 57 shifted into the gear 71 takes place through the gears 57 and 71 to the gear 63 of the double gear 61 which being fixed on the shaft 58 drives this shaft, causing the pinion 64 fixed thereon to drive the respective gear 55 and 56 of the compound gear 54 which in turn drives the gear 66 of the compound gear 65 which with its gear 67 in turn driving the gear 72 and has the gear 76 fixed on the shaft 68. Now in effecting this reduction drive to the gears just described but in the opposite direction, gear 57 is shifted into engagement with the gear 62 in which case the shaft 58 is then driven from the gear 57 and gear 62 of the compound gear 61 and thereby effecting the reversal of drive to the shaft 58 relative to the shaft 50 and to the respective compound gears 54 and 65 to the gears 72 as already described, so as to effect the reverse driving action at this reduced gear ratio. Thus the gear 77 on the output shaft 68 of this box is capable of being driven at two different speeds and also in both directions by the appropriate manipulation of the levers 78 and 79.

This pinion 76 is arranged to drive the large clutch gear 77a which gear is suitably journaled on a bearing 78a on the drive shaft 25. Suitable clutch mechanism indicated generally at 79a and adapted to be operated by the clutch actuating spool 80 operated by a suitable clutch shifting yoke 81 carried on the shafts 82 and 83 appropriately journaled in the leg 2 of the lathe, serves to connect or disconnect the gear 77 in driving relation with the shaft 25. The actuation of this clutch spool 80 for effecting this engagement or disengagement of the driving relation of the gear 77 on the shaft 25 is effected by means of a pair of solenoids 84 and 85, Figures VI and VII, which are connected by suitable linkage 86 and 87 respectively to the lever 88 which is fixed on the stub shaft 83 so that it may be rocked to effect rocking of the yoke 81 and thereby effect engagement and disengagement of the clutch device 79.

The operation of this device is carried on by the usual conventional electrical control apparatus (not shown) for the rapid traverse motor 21 and the solenoids 84 and 85 that when the rapid traverse motor 21 is being energized for rapid rotation of the screw 17 to effect rapid traversing movement in the boring bar holder 12 the solenoids 84 will be actuated so as to release the clutch 79a to permit free rotation of the gear 77 relative to the shaft 25. Under these conditions the shaft 25 is merely being driven idly by the gear 24 connected to the motor pinion 22 while the screw 17 is being rotated by the associated gearing 29 and 31 as described. However, when it is desired to stop the traverse motion the electrical energy is instantly cut off from the motor 21 while the solenoid 85 is simultaneously instantly energized, whereupon the clutch member 79 is rendered effective to instantly clutch the gear 77 to the shaft 25, the result of which simultaneous operation results in the instant stopping of the momentum in the motor 21 and associated gearing to the screw 17 so that the rapid traverse is instantly and accurately brought to a stop, while the feeding may be continuing under the influence of the drive from the headstock shaft 32 and sprocket 33, as described. Since this relative feeding motion is very slow and since the gear ratio between the gear 77 and the sprocket 33 through the transmission and feed boxes 46 and 51 described is very large momentum built up during the rapid traverse motion does not cause any driving of this feeding transmission. During the driving of the shaft 25 by the feeding motion from the sprocket 33 of the headstock, the motor 21 of course, is slowly being rotated idly by the gear 24 on the shaft 25.

When it is again desired to instantly engage the rapid traverse, the solenoid 84 is then instantly energized simultaneously with the energizing of the motor 21 so that the motor may immediately have free access to the driving power to the screw 17 without the interference or drag which might be imposed by the feeding transmission mechanism from the sprocket 33 of the headstock.

Also in conjunction with the arrangement of feed and rapid traverse mechanism is provided a conventional feed box 46 in the feeding transmission which permits careful and accurate quick selection of speed changes in conjunction with the rapid traverse mechanism associated therewith. Also in conjunction with this feed and rapid traverse arrangement is provided means for reversing the feeding driving power without affecting the rapid traversing mechanism and also to provide in conjunction with the reversing mechanism, means for effecting a plurality of different speeds in conjunction with this reversing mechanism.

Having thus fully set forth and described our invention what we claim as new and desire to secure by United States Letters Patent is:

1. In a boring lathe, a longitudinally extending bed, a headstock mounted on said bed, a rotatable work spindle in said headstock, a boring bar actuating device slidably mounted for longitudinal movement on said bed relative to said headstock, a rotatable screw mounted longitudinally of said bed, means interconnecting said boring bar actuating device and said screw whereby rotation of said screw effects longitudinal movement of said actuating device, an electric motor connected to said screw, means for energizing said motor to effect its rotation in either direction for rapidly rotating said screw to rapid traverse said boring bar actuating device, a quick change feed box driven from the headstock of said lathe, a coarse speed feed change box driven from said quick change feed box, and clutch means for connecting or disconnecting said coarse speed feed change box relative to said screw.

2. In a boring lathe, a longitudinally extending bed, a headstock mounted on said bed, a rotatable work spindle in said headstock, a boring bar actuating device slidably mounted for longitudinal movement on said bed relative to said headstock, a rotatable screw mounted longitudinally of said bed, means interconnecting said boring bar actuating device and said screw whereby rotation of said screw effects longitudinal movement of said actuating device, an electric motor connected to said screw, means for energizing said motor to effect its rotation in either direction for rapidly rotating said screw to rapid traverse said boring bar actuating device, a quick change feed box driven from the headstock of said lathe, a coarse speed feed change box driven from said quick change feed box, reversing gearing in said coarse speed feed change box, and clutch means for connecting or disconnecting said coarse speed feed change box relative to said screw.

WILLIAM F. GROENE.
GEORGE W. LUNING.